(12) United States Patent
Gill

(10) Patent No.: US 7,265,946 B2
(45) Date of Patent: Sep. 4, 2007

(54) MULTILAYER SELF-PINNED STRUCTURE FOR CPP GMR

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 292 days.

(21) Appl. No.: 10/837,353

(22) Filed: Apr. 30, 2003

(65) Prior Publication Data

US 2005/0007707 A1 Jan. 13, 2005

(51) Int. Cl.
*G11B 5/39* (2006.01)
(52) U.S. Cl. .................................. 360/324.11
(58) Field of Classification Search ............ 360/324.11
See application file for complete search history.

(56) References Cited

U.S. PATENT DOCUMENTS

| | | | | |
|---|---|---|---|---|
| 5,103,553 A * | 4/1992 | Mallary | ................... | 29/603.13 |
| 5,583,725 A * | 12/1996 | Coffey et al. | .......... | 360/324.11 |
| 5,731,936 A * | 3/1998 | Lee et al. | ............... | 360/327.22 |
| 5,869,963 A * | 2/1999 | Saito et al. | .................. | 324/252 |
| 5,920,446 A * | 7/1999 | Gill | ............................. | 360/324 |
| 5,923,505 A * | 7/1999 | Kroes et al. | ............ | 360/327.22 |
| 6,040,961 A * | 3/2000 | Gill | ........................ | 360/324.11 |
| 6,141,191 A * | 10/2000 | Lee et al. | ................. | 360/324.1 |
| 6,208,491 B1 * | 3/2001 | Pinarbasi | .................. | 360/324.1 |
| 6,208,492 B1 * | 3/2001 | Pinarbasi | ............... | 360/324.11 |
| 6,411,476 B1 * | 6/2002 | Lin et al. | ............... | 360/324.11 |
| 6,865,062 B2 * | 3/2005 | Pinarbasi | ............... | 360/324.11 |
| 6,873,501 B2 * | 3/2005 | Zheng et al. | .......... | 360/324.12 |
| 2002/0159205 A1 | 10/2002 | Kula et al. | ............. | 360/324.11 |
| 2003/0002228 A1 | 1/2003 | Suwabe et al. | .......... | 360/324.1 |
| 2003/0021071 A1 | 1/2003 | Kula et al. | ............... | 360/324.1 |

* cited by examiner

*Primary Examiner*—Brian E. Miller
(74) *Attorney, Agent, or Firm*—Zilka-Kotab, PC

(57) ABSTRACT

A self pinned CPP GMR sensor having an AP1 layer extending beyond the track width of the sensor and a multilayer AP2 layer including layers of CoFe interspersed with thin non-magnetic layers such as Cu.

24 Claims, 4 Drawing Sheets

MULTILAYER SELF-PINNED STRUCTURE FOR CPP GMR

FIELD OF THE INVENTION

The present invention relates to giant magnetoresistive (GMR) sensors and more particularly to an improved self pinned structure that provides increased magnetoresistive effect

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Traditionally, the magnetization of a pinned layer has been fixed by exchange coupling one of the ferromagnetic layers (AP1) with a layer of antiferromagnetic material such as PtMn. While an antiferromagnetic material such as PtMn does not in and of itself have a magnetization, when exchange coupled with a magnetic material, it can strongly pin the magnetization of the ferromagnetic layer.

The ever increasing quest for faster data rates and increased data capacity requires ever decreasing bit lengths, in order to fit more bits onto a given inch of data track. This in turn requires sensor to have decreased sensor thickness (stack height). Unfortunately, in order to pin a pinned layer as described above through exchange coupling with an AFM layer, the AFM layer must be deposited very thick relative to the other layers in the sensor stack. In the drive for decreased sensor thickness such an AFM layer uses an unacceptable amount of gap budget.

In order to overcome this, sensors have recently been designed with self pinned pinned layers. Pinning in a self pinned layer is generally achieved primarily by stress induced anisotropy caused by constructing the pinned layers of a material having a high positive magnetostriction. Compressive forces which inevitably occur in a sensor, in combination with the high positive magnetostriction of the pinned layers causes the magnetization to be pinned in a desired direction perpendicular to the air bearing surface (ABS). A self pinned structure includes first and second layers of ferromagnetic material that are antiparallel coupled across a coupling layer such as Ru, similar to the conventional AP coupled pinned layer described above. In order to increase pinning strength, in a self pinned layer structure the magnetic thicknesses of the two ferromagnetic layers (AP1 and AP2) are substantially equal (ie. δm=0).

Although self pinned structures have shown promise for decreasing stack height of a sensor, the can be prone to amplitude flipping. Amplitude flipping occurs when the directions of magnetization of the pinned layer flip 180 degrees. This renders the head unusable. Therefore, there is a need for a mechanism for increasing the robustness of a pinned layer in a self pinned sensor.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor.

The ever increasing demand for data storage density and data rate have increasingly pushed the limits of data storage designs. Recently in efforts to overcome such limits, engineers and scientists have focused on the use of perpendicular recording. In a perpendicular recording system a write pole emits a highly concentrated magnetic field that is directed perpendicular to the surface of the medium (eg. the disk). This field in turn magnetizes a localized portion of the disk in a direction perpendicular to the surface of the disk, thereby creating a bit of data. The resulting flux travels through the disk to a return path having a much larger area than the area in which the bit was recorded. The increased interest in perpendicular recording has lead to an increased interest in current perpendicular to plane (CPP) GMRs sensors, which are particularly suited to use in perpendicular recording.

As can be seen from the above, there is a strong felt need for a means for stabilizing pinning of a self pinned sensor in order to take advantage of the decreased thickness provided by the use of self pinned layers while avoiding unacceptable amplitude flipping. Such a mechanism would preferably be useful in a CPP sensor design, since such sensors will be the focus of future perpendicular recording storage devices. In addition, as demands for improved performance increase, there is a need to further increase the magnetoresistive effect of sensor (dr/R), as this is the primary performance measurement of a sensor.

SUMMARY OF THE INVENTION

The present invention provides a self pinned CPP GMR sensor having improved pinned layer resistance to amplitude flipping and also provides improved magnetoresistive effect (dr/R). The sensor includes a pinned layer having first and second ferromagnetic layers (AP1 and AP2) constructed of a high positive magnetostriction material. The first layer (that furthest from the free layer) extends substantially beyond the track width of the sensor. That is to say it extends laterally much further than the other layers. The second magnetic layer (AP2) is constructed of multiple layers of high magnetostriction magnetic material separated by thin layers of non-magnetic, electrically conductive material.

Extending the first magnetic layer (AP1) beyond the track width improves the robustness of the pinned layer by increasing the stress induced anisotropy of the AP1 layer as well as the shape anisotropy of this layer.

Constructing the second magnetic layer (AP2) as a multilayer structure as described improves the GMR performance for several reasons. First, providing extra non-magnetic, electrically conductive layers within the pinned layer increases the interfacial scattering of electrons in the same manner that the interface between the spacer layer and the pinned layer contributes to GMR effect. In essence, the non-magnetic layers within the pinned layer provide additional spacer layers.

The presence of the non-magnetic layers also advantageously increase the physical thickness of the AP2 layer (that closest to the free layer) while allowing the magnetic thickness of the AP2 layer to remain substantially the same as the AP1 layer. As those skilled in the art will appreciate, the magnetoresistive effect of the AP2 layer will add to the GMR effect, however, any GMR effect provided by the AP1 layer (that which is furthest from the free layer) will actually subtract from the total GMR of the sensor. This is because the AP1 layer is 180 degrees out of phase with the AP2 layer. Since the AP2 layer is much closer to the spacer layer, and to the free layer, its contribution to the total GMR is much greater than the subtractive effect of the AP1 layer. By increasing the physical thickness of the AP2 layer the AP1 layer can be located even further from the spacer and free layers, thereby further decreasing its subtractive effect.

What's more, the presence of the non-magnetic layers within the AP2 layer create interfaces within the AP2 layer that increase scattering of electrons flowing therethrough. This further decreases the subtractive GMR effect by greatly reducing the spin polarization of electrons by the time they reach the AP1 layer.

In addition, extending the AP1 layer laterally beyond the track width of the sensor allows current flowing into the AP1 layer to spread out laterally as it flows into the AP1 layer. This further decreases the subtractive effect of the AP1 layer by shunting some of the current out of the active area of the sensor.

These and other advantages of the invention will be better appreciated upon reading the following detailed description in conjunction with the accompanying Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
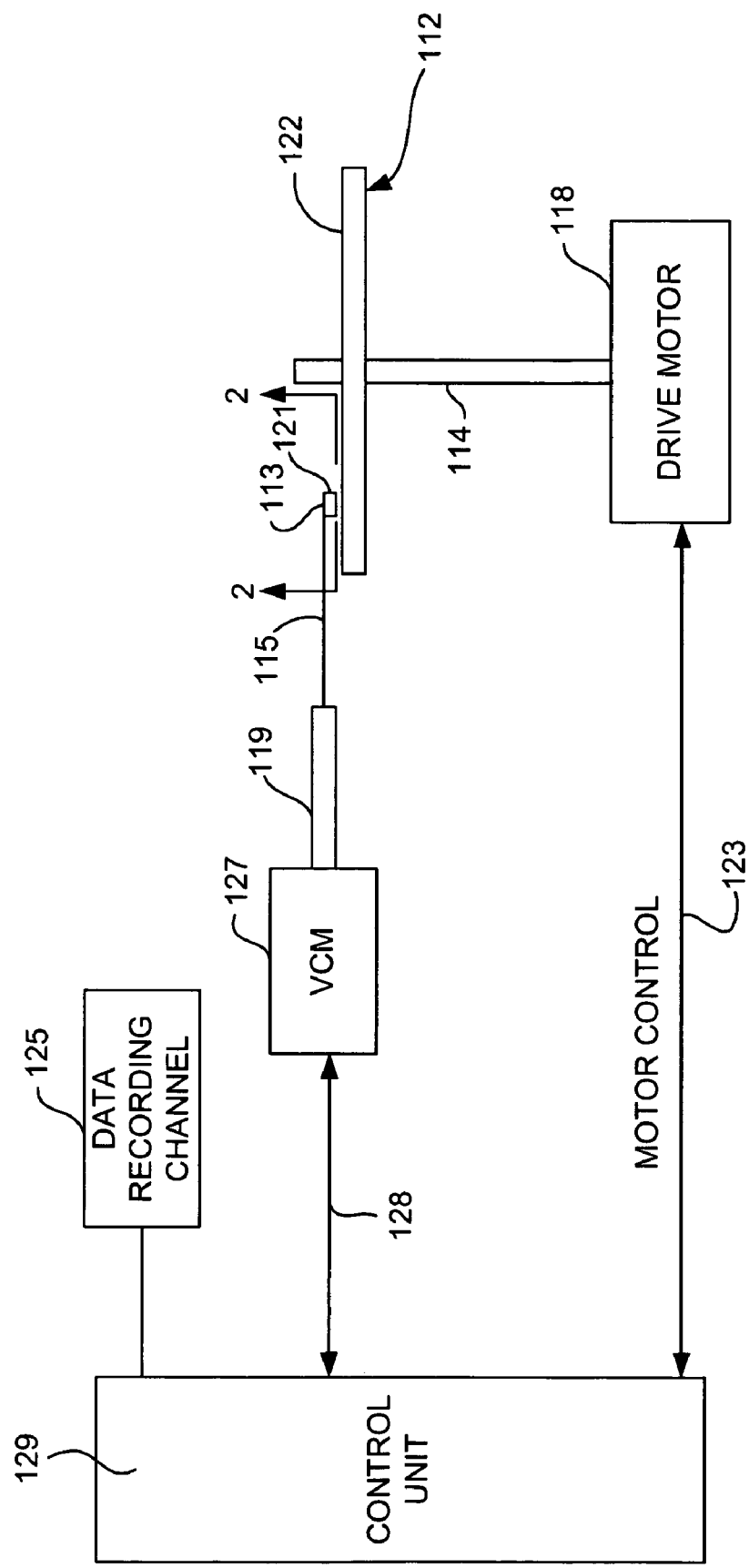
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
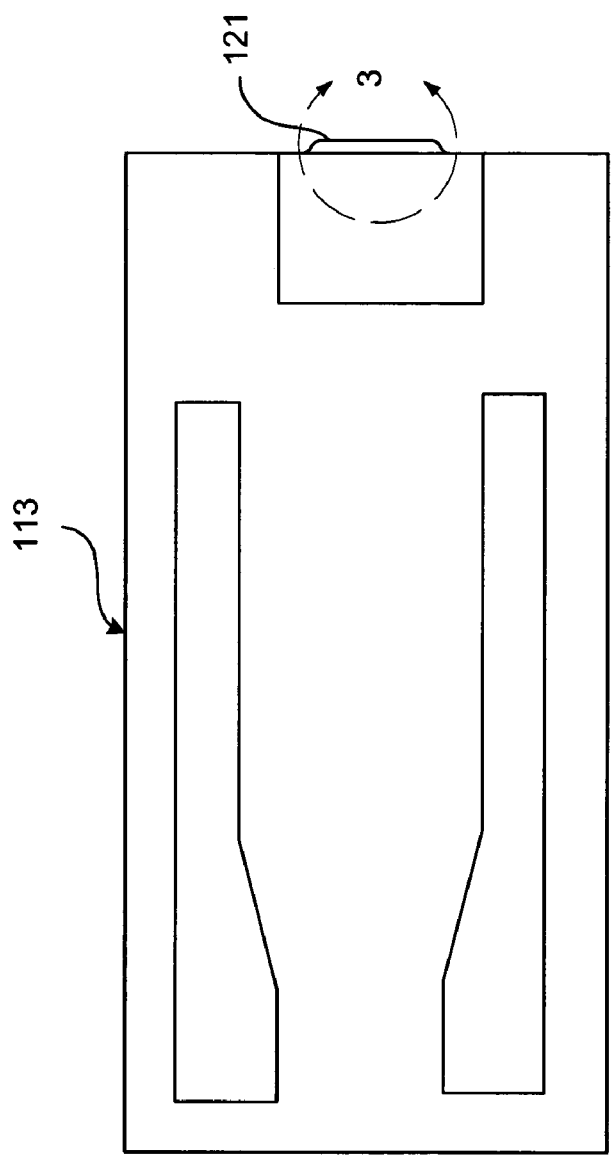
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
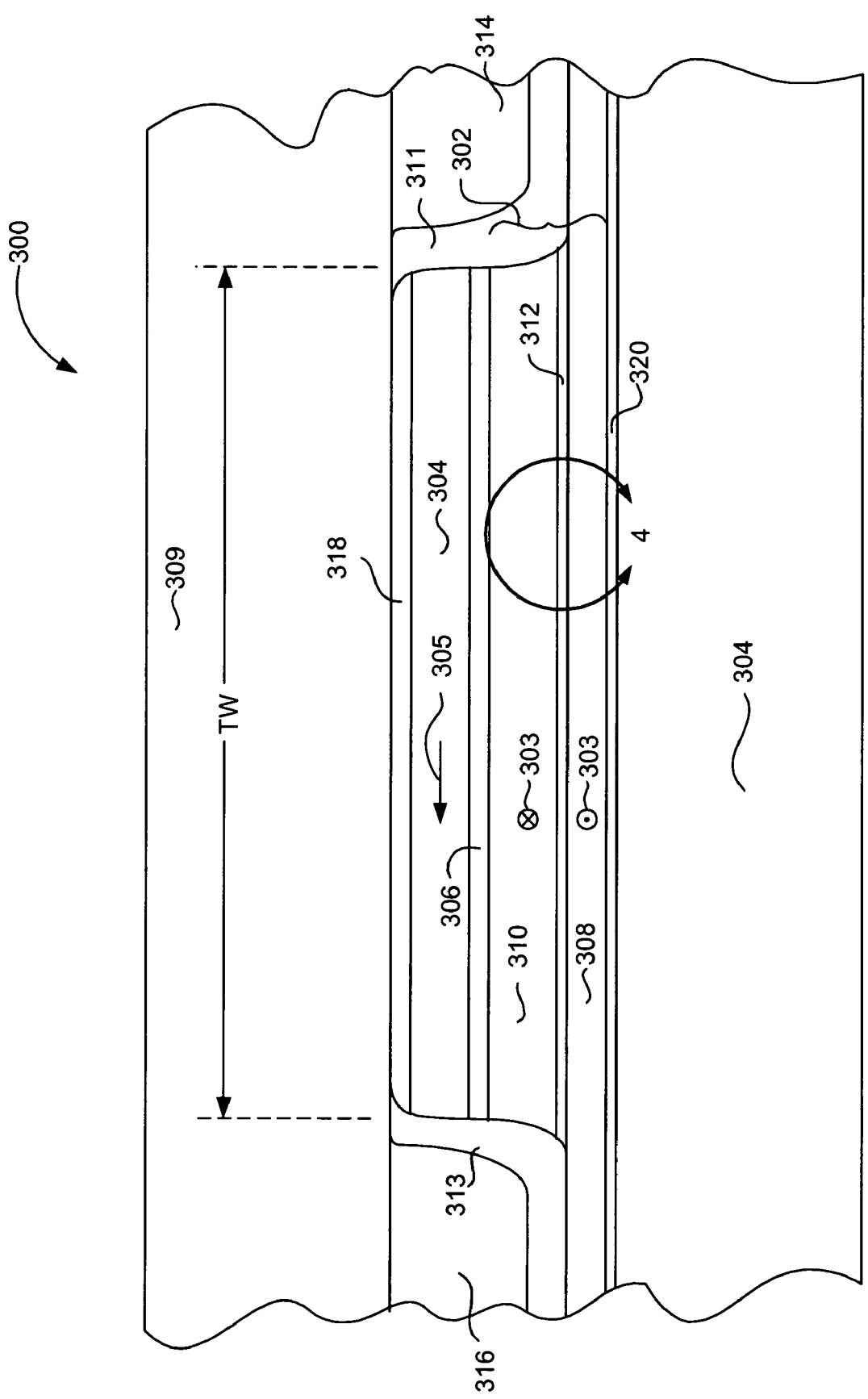
FIG. 3 is an ABS view of a magnetic sensor according to an embodiment of the present invention taken from circle 3 of FIG. 2.

With reference now to FIG. 3, a CPP magnetoresistive sensor 300 according to the present invention includes a pinned layer 302 and a free layer 304. A spacer layer 306 separates the pinned layer 302 from the free layer 304. The spacer layer 306 is constructed of a non-magnetic, electrically conductive material such as for example Cu. The free layer 304 has a magnetization that is biased parallel to the ABS as indicated by arrow symbol 305, but is free to rotate in response to a magnetic field. The pinned has magnetizations 303 that in the AP1 and AP2 layers 308, 310 that are directed perpendicular to the ABS and antiparallel to one another.

The sensor 300 is sandwiched between upper and lower electrically conductive, magnetic shields 307, 309, which also function as leads for supplying sense current to the sensor 300. First and second electrically insulating fills layers 311, 313 are provided at each of the laterally opposed sides of the sensor.

With continued reference to FIG. 3, the pinned layer structure can include first and second magnetic layers AP1 308 and AP2 310 separated from one another by a non-magnetic AP coupling layer 312 such as Ru. First and second bias layers 314, 316 are provided at either side of the sensor 300 outside of the insulator layers 311, 313. The bias layers 314, 316 are constructed of a high coercivity (high Hc) magnetic material such as CoPt and are used to bias the magnetization of the free layer in a direction parallel with the ABS.

A capping layer 318, such as Ta can be provided at the top of the sensor to protect the sensor layers from corrosion and other damage. In addition, the sensor 300 can be built upon a seed layer 320, which can be constructed as multiple layers 320a. 320b. 320c. etc. that may include for example Ta(30Angstroms)NiFeCr(30Angstroms) or could be for example Ru(8Angstroms). The seed layer could also be Ta(30Angstroms)/NiFeCr(25Angstroms)/NiFe(8Angstroms)/PtMn(30Angstroms). These seed layers are provided by way of example only, and other possible seed layer materials and thicknesses may become apparent to those skilled in the art. The seed layer preferably has a face centered cubic (FCC) grain structure that induces a similar FCC grain structure in layers deposited thereabove.

With continued reference to FIG. 3, the lateral width of the free layer 304, spacer layer 306 and AP2 layer 310 define a track width TW of the sensor 300. The track width is the width at which the sensor detects signal. As discussed above, in order to increase data density (ie. by increasing the number of tracks per inch) it is desirable to construct sensors having small track widths TW. As can be seen with reference to FIG. 3, the AP1 layer 308 extends substantially beyond the track width TW. This provides substantial pinned layer stabilization, preventing amplitude flipping by increasing the stress anisotropy as well as the shape anisotropy.

Figure 4:
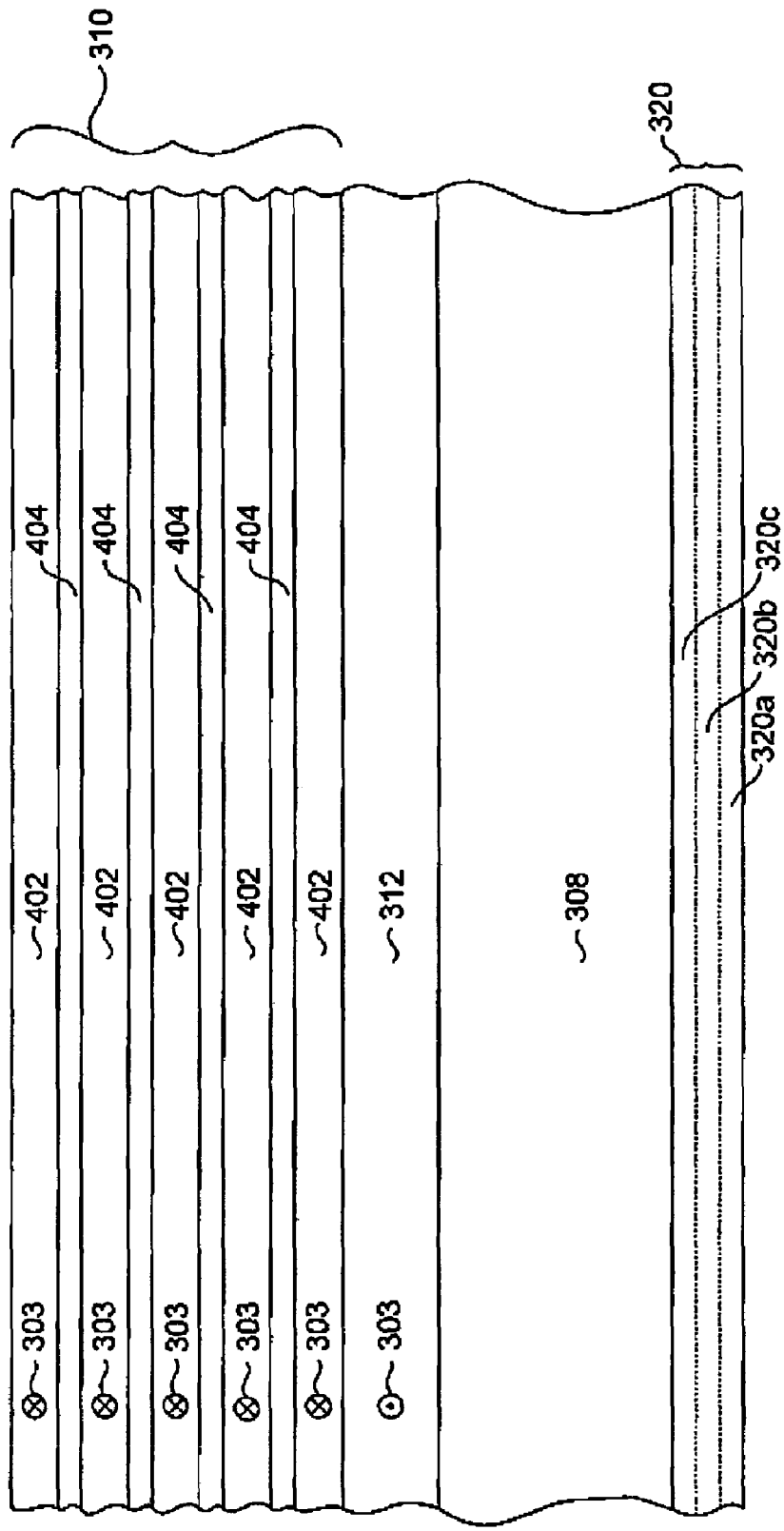
FIG. 4 is an expanded view taken from circle 4 of FIG. 3 showing a pinned layer structure according to an embodiment of the present invention.

With reference now to FIG. 4, the structure of the pinned layer 302 can be seen in more detail. As discussed previously, the pinned layer 302 includes a first magnetic layer AP1 308, and a second magnetic layer AP2 310. The AP1 layer 308 and AP2 layer 310 are antiparallel coupled across a coupling layer 312.

The AP1 layer 308 is constructed of a magnetic material having a high positive magentostriction Hc, such as for example CoFe. The AP1 layer 308 has a magnetic thickness $Tm_{AP1}$. By way of example, this magnetic thickness could be 40 Angstroms.

The AP2 layer includes a plurality of magnetic, high magnetostriction (high Hc) layers 402. These magnetic layers 402 could be constructed of for example CoFe. Each magnetic layer 402 has a magnetic thickness, and the magnetic thicknesses of all of the magnetic layers 402 of the AP2 layer 310 summed together defines a magnetic thickness $Tm_{AP2}$ of the AP2 layer 310. Ideally, the magnetic thickness $Tm_{AP2}$ of AP2 is substantially equal to the magnetic thickness $Tm_{AP1}$ of AP1.

The AP2 magnetic layer 310 also includes a plurality of non-magnetic, electrically conductive layers 404. The non-magnetic layers 404 are preferably constructed of the same material as the spacer layer 306 (FIG. 3) such as for example Cu. The non-magnetic electrically conductive layers 404 could also be constructed of other materials such as Ag or Au. The non-magnetic layers 404 are constructed of a thickness such that the magnetizations of each of these layers 402 will be directed in the same direction as indicated by arrowhead symbols 303. The non-magnetic, electrically conductive layers 404 are preferably very thin relative to the other layers. For example, if the AP1 layer 308 had a thickness of 40 Angstroms, then the AP2 layer 310 could include for example 5 magnetic layers 402 having a thickness of 20 Angstroms each and the spacer layers 404 could have a thickness 5 to 10 Angstroms. As another example, the AP1 layer 308 could have a thickness of 40 Angstroms and the AP2 layer 310 could include 10 magnetic layers 402 having a thickness of 10 Angstroms each and the non-magnetic layers 404 could have a thickness of 5 to 10 Angstroms each.

As discussed above, the presence of the non-magnetic layers beneficially places the AP2 layer 308 further from the free layer 304 and spacer layer 306, thereby reducing the subtractive GMR effect of that layer. In addition, the presence of the non-magnetic layers provides additional interfaces which increase scattering of electrons. This decreases the spin polarization of the electrons as they enter the AP2 layer, thereby further decreasing the subtractive GMR effect of the AP1 layer 308. Perhaps more importantly, the presence of the non-magnetic layers 404, increases the additive GMR effect of the AP2 layer 310 by creating additional interface layers in the AP2 layer 310, effectively acting as additional spacer layers.

It should be appreciated that the present invention can be practiced in a self pinned sensor (ie no exchange coupling with an AFM layer) or in an AFM pinned sensor. Although not shown in the figures, if the sensor 300 were a self pinned sensor a layer of antiferromagnetic material such as PtMn or some other antiferromagnetic material would be disposed beneath and exchange coupled with the AP1 layer 308. The present invention can also be practiced equally well in a CIP GMR, CPP GMR, or tunnel valve.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive (GMR) sensor, comprising:
   a magnetic pinned layer structure;
   a magnetic free layer; and
   a non-magnetic, electrically conductive spacer layer sandwiched between said pinned layer structure and said free layer structure;
   said magnetic pinned layer structure further comprising:
      a first magnetic layer (AP1) having a lateral width extending substantially beyond a track width of said sensor, the AP1 having a magnetization pinned in a first direction;
      a second magnetic layer structure (AP2) comprising a plurality of magnetic layers separated by non-magnetic, electrically conductive layers, each of the magnetic layers having a magnetization that is pinned in a second direction that is substantially antiparallel with the first direction; and
   a non-magnetic, electrically conductive antiparallel coupling layer sandwiched between said first magnetic layer (AP1) and said second magnetic layer structure (AP2).

2. A sensor as in claim 1, further comprising a seed layer deposited beneath said pinned layer structure.

3. A sensor as in claim 1, further comprising a seed layer comprising a layer of Ta and a layer of NiFeCr, deposited beneath said pinned layer structure.

4. A sensor is in claim 3, wherein said layer of Ta has a thickness of about 30 angstroms and said layer of NiFeCr has a thickness of about 30 angstroms.

5. A sensor as in claim 1, further comprising a seed layer comprising Ta.

6. A sensor claim as in claim 5 wherein said Ta seed layer has a thickness of about 8 angstroms.

7. A sensor as in claim 1, further comprising a seed layer formed beneath said pinned layer structure, said seed layer comprising a layer of Ta, a layer of NiFeCr, a layer of NiFe and a layer of PtMn.

8. A sensor as in claim 7 wherein said Ta layer has a thickness of about 30 angstroms, said NiFeCr layer has a thickness of about 25 angstroms, said NiFe layer has a thickness of about 8 angstroms, and said PtMn layer has a thickness of about 30 angstroms.

9. A sensor as in claim 1 wherein said AP1 layer comprises CoFe.

10. A sensor as in claim 1 wherein said AP1 layer comprises a layer of CoFe having a thickness of about 30 angstroms.

11. A sensor as in claim 1 wherein said magnetic layers of said AP2 layer each comprise CoFe.

12. A sensor as in claim 1 wherein said magnetic layers of said AP2 layer each comprise CoFe and said non-magnetic, electrically conductive layers each comprise Cu.

13. A sensor as in claim 1 wherein said magnetic layers of said AP2 layer each comprise CoFe and said non-magnetic, electrically conductive layers each comprise Au.

14. A sensor as in claim 1 wherein said magnetic layers of said AP2 layer each comprise CoFe and said non-magnetic, electrically conductive layers each comprise Cu.

15. A sensor as in claim 1 wherein said magnetic layers of said AP2 layer each comprise CoFe and said non-magnetic, electrically conductive layers of said AP2 layer each comprise the same material as that making up said spacer layer.

16. A sensor as in claim 1 wherein said magnetic layers of said AP2 layers each have a magnetic thickness which when summed together define an AP2 magnetic thickness, and wherein said AP1 layer has a magnetic thickness substantially equal to said AP2 magnetic thickness.

17. A sensor as in claim 1 wherein said magnetic layers of said AP2 layer each have a thickness of about 10 angstroms and said non-magnetic, electrically conductive layers of said AP2 layer each have a thickness of 5 to 10 angstroms.

18. A sensor as in claim 1 wherein said nonmagnetic, electrically conductive coupling layer comprises Ru.

19. A sensor as in claim 1 wherein said AP1 layer extends beyond said trackwidth a distance greater than or equal to said trackwidth.

20. A sensor as in claim 1 wherein said spacer layer comprises Cu.

21. A sensor as in claim 1 wherein said spacer layer comprises a layer of Cu having a thickness of about 20 Angstroms.

22. A sensor as in claim 1, wherein said magnetic pinned layer is self pinned.

23. A sensor as in claim 1, wherein said pinned layer is pinned by exchange coupling with an antiferromagnetic layer.

24. A magnetic data storage system, comprising:
   a magnetic medium;
   an actuator;
   a slider connected with said actuator for movement adjacent to a surface of said magnetic medium;
   a magnetoresistive sensor connected with said slider, said magnetoresistive sensor comprising:
   a magnetic pinned layer structure;
   a magnatic free layer, and
   a non-magnetic, electrically conductive spacer layer sandwiched between said pinned layer structure and said layer structure;

said magnetic pinned layer structure further comprising:
a first magnetic layer (AP1) having a lateral width extending substantially beyond a track width of said sensor, the AP1 having a magnetization that is pinnned in a first direction;
a second magnetic layer structure (AP2) comprising a plurality of magnetic layers separated by non-magnetic, electrically conductive layers, each of the magnetic layers having a magnetization that is pinned in a second direction that is substantially antiparallel with the first direction; and
a non magnetic, electrically conductive antiparallel coupling layer sandwiched between said first magnetic layer (AP1) and said second magnetic layer structure (AP2).

* * * * *